(12) United States Patent
Meixner (10) Patent No.: US 9,019,284 B2
(45) Date of Patent: Apr. 28, 2015

(54) INPUT OUTPUT CONNECTOR FOR ACCESSING GRAPHICS FIXED FUNCTION UNITS IN A SOFTWARE-DEFINED PIPELINE AND A METHOD OF OPERATING A PIPELINE

(71) Applicant: Nvidia Corporation, Santa Clara, CA (US)

(72) Inventor: Albert Meixner, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 196 days.

(21) Appl. No.: 13/722,901

(22) Filed: Dec. 20, 2012

(65) Prior Publication Data

US 2014/0176578 A1 Jun. 26, 2014

(51) Int. Cl.
*G06T 1/00* (2006.01)
*G06T 1/20* (2006.01)

(52) U.S. Cl.
CPC .................................... *G06T 1/20* (2013.01)

(58) Field of Classification Search
CPC ....... G06T 1/20; G06T 15/00; G06T 2210/52; G06F 9/3885; G06F 5/001
USPC .......................................... 345/522, 506, 520
See application file for complete search history.

(56) References Cited

U.S. PATENT DOCUMENTS

| 6,385,632 | B1 | 5/2002 | Choe et al. |
|---|---|---|---|
| 6,919,896 | B2 | 7/2005 | Sasaki et al. |
| 7,146,486 | B1 | 12/2006 | Prokopenko et al. |
| 7,158,141 | B2 | 1/2007 | Chung et al. |
| 7,213,136 | B2 | 5/2007 | Sperber et al. |
| 7,307,638 | B2 | 12/2007 | Leather et al. |
| 7,568,189 | B2 | 7/2009 | Suba et al. |
| 7,788,468 | B1 | 8/2010 | Nickolls et al. |
| 8,106,914 | B2 | 1/2012 | Oberman et al. |
| 8,578,129 | B2 | 11/2013 | Blinzer et al. |
| 2008/0030510 | A1 | 2/2008 | Wan et al. |
| 2009/0307472 | A1 | 12/2009 | Essick IV et al. |
| 2011/0078417 | A1 | 3/2011 | Fahs et al. |
| 2011/0279473 | A1* | 11/2011 | Cabral et al. .................. 345/589 |
| 2012/0266165 | A1 | 10/2012 | Cen et al. |

(Continued)

FOREIGN PATENT DOCUMENTS

TW 200937341 A 9/2009

OTHER PUBLICATIONS

Lee, Y., et al., "Exploring the Tradeoffs between Programmability and Efficiency in Data-Parallel Accelerators," ISCA, Jun. 4-8, 2011, ACM, pp. 129-140.

(Continued)

*Primary Examiner* — Hau Nguyen (57) ABSTRACT

An input output connector for a graphics processing unit having a graphics pipeline including fixed function units and programmable function units is disclosed. Additionally, a graphics processing unit and a method of operating a graphics pipeline are disclosed. In one embodiment, the input output connector includes: (1) a request arbiter configured to connect to each of the programmable function units, receive fixed function requests therefrom and arbitrate the requests and (2) fixed unit converters, wherein each of the fixed unit converters is dedicated to a single one of the fixed function units and is configured to convert the requests directed to the single one to an input format for the single one.

20 Claims, 3 Drawing Sheets

(56) References Cited

U.S. PATENT DOCUMENTS

2012/0299943 A1    11/2012   Merry
2014/0055453 A1*   2/2014   Maxim .................. 345/419
2014/0176569 A1    6/2014   Meixner

OTHER PUBLICATIONS

Wittenbrink, C. M., et al., "Fermi GF100 GPU Architecture," IEEE Computer Society, Mar./Apr. 2011, pp. 50-59.

* cited by examiner

INPUT OUTPUT CONNECTOR FOR ACCESSING GRAPHICS FIXED FUNCTION UNITS IN A SOFTWARE-DEFINED PIPELINE AND A METHOD OF OPERATING A PIPELINE

TECHNICAL FIELD

This application is directed, in general, to graphics processing units (GPUs) and, more specifically, to graphic pipelines of a GPU.

BACKGROUND

In traditional GPUs, fixed function units are statically connected together to form a fixed function graphics pipeline. The output packets of each of the fixed function units, or fixed function stages, are designed to match the input packets of the downstream fixed function unit. In some conventional GPUs, programmable function stages are statically connected with fixed function units to form a graphics pipeline. Programmable function stages are implemented by writing fixed function outputs into a software-visible buffer, running the program, and reading the program outputs back into the next fixed function stage. This arrangement provides efficient flow of state and data through a graphics pipeline having programmable function stages. However, major changes to the way the graphics pipeline operates require hardware modifications to the static connections.

A more flexible approach is to define the graphics pipeline in software as a program or programs running on a programmable processor. In such a pipeline, the functional stages are implemented in software with data being moved via a regular general purpose memory system.

SUMMARY

In one aspect, an input output connector for a graphics processing unit having a graphics pipeline including fixed function units and programmable function units is disclosed. In one embodiment, the input output connector includes: (1) a request arbiter configured to connect to each of the programmable function units, receive fixed function requests therefrom and arbitrate the requests and (2) fixed unit converters, wherein each of the fixed unit converters is dedicated to a single one of the fixed function units and is configured to convert the requests directed to the single one to an input format for the single one.

In another aspect, a method of operating a graphics pipeline having fixed function units and programmable function units is disclosed. In one embodiment, the method includes: (1) receiving a request from one of the programmable function units for one of the fixed function units to generate a response, (2) obtaining parameters and state information for the request, (3) routing the request including the parameters and the state information to one of multiple interface logic, wherein each of the multiple interface logic is dedicated for a single one of the fixed function units and (4) converting the request, employing the interface logic, to a unit specific input format for the one of the fixed function units.

In yet one other aspect, a graphics processing unit is disclosed. In one embodiment, the graphics processing unit includes: (1) fixed function units, (2) programmable function units and (3) a single input output connector configured to connect each of the programmable function units to each of the fixed function units.

BRIEF DESCRIPTION

Reference is now made to the following descriptions taken in conjunction with the accompanying drawings, in which.

DETAILED DESCRIPTION

Though software defined graphics pipelines are flexible, such a pipeline still requires certain fixed function blocks (or units) to accelerate work-intensive routines in order to provide competitive performance. To utilize existing fixed function units in a graphics pipeline with software defined stages and to efficiently add new fixed function units, various problems need to be addressed.

As such, disclosed herein is an IO connector that provides a programmable pipeline with dynamically defined connections between stages instead of static connections. The disclosed IO connector communicates inputs and outputs between fixed function units and processor grids or cores used for the programmable function stages (or units). Additionally, the IO connector communicates various states between the programmable function units and the fixed function units. Inputs and outputs are also translated between a software-friendly format of the programmable function units and a hardware-friendly format of the fixed function units. Furthermore, the IO connector translates states between a software-friendly format and a hardware-friendly format.

In one embodiment, the IO connector advantageously provides all of the above noted functions in a single processing block that is shared across all fixed function units and multiple programmable function units. A programmable function unit is a processor or a portion thereof that can be programmed to perform fixed function tasks. The processor can be a special purpose processor that is specifically designed to operate with highly parallel code. A programmable function unit is referred to herein as a streaming multiprocessor (SM). A SM is capable of executing a relatively large number of threads concurrently. Advantageously, each streaming multiprocessor can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Examples of function units, fixed function or programmable, include a pixel shader, a vertex shader, a geometry shader, etc.

The IO connector advantageously provides a single interface that includes the necessary logic to dynamically connect multiple SMs and fixed function units to form a graphics pipeline and manage instruction level communications therebetween. The IO connector includes multiple components that provide bi-directional connections including bi-directional control connections to SMs, bi-directional data connections to shared memories associated with the SMs and a bi-directional connection into a global memory system associated with a graphic processing unit. The IO connector also includes arbiters for managing connections including a request arbiter and a response arbiter. In addition, the novel IO connector includes additional logic including shared conversion logic, per-unit conversion logic, shadow state logic and a request data fetch unit. A state cache is also included.

Before describing various embodiments of the novel IO connector and methods associated therewith, a computing system within which the IO connector may be embodied or a method of operating a graphics pipeline is carried out will be described.

Figure 1:
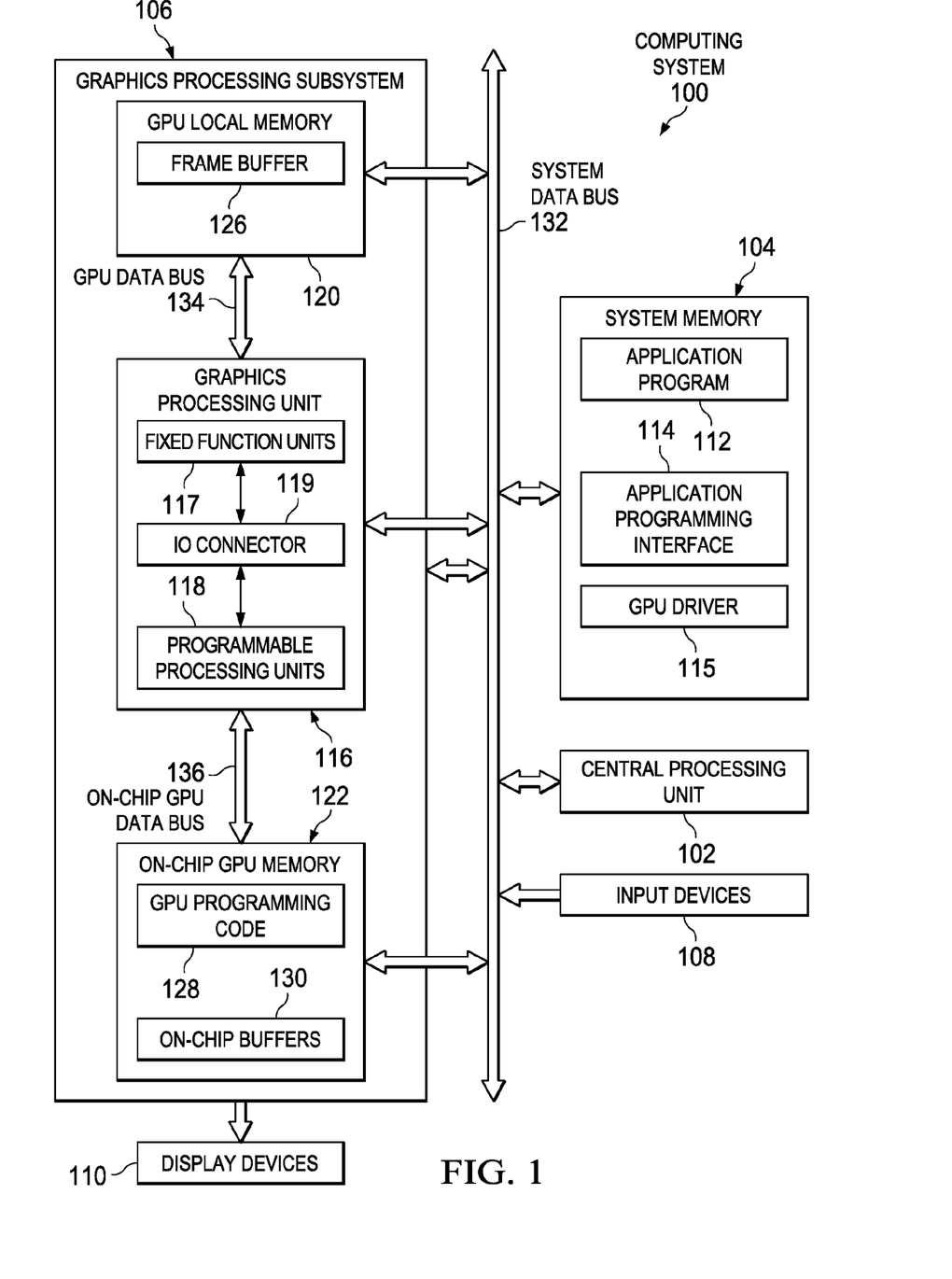
FIG. 1 is a block diagram of an embodiment of a computing system in which one or more aspects of the disclosure may be implemented.

FIG. 1 is a block diagram of one embodiment of a computing system 100 in which one or more aspects of the invention may be implemented. The computing system 100 includes a system data bus 132, a central CPU 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 104 may connect directly to the CPU 102. The CPU 102 receives user input from the input devices 108, executes programming instructions stored in the system memory 104, operates on data stored in the system memory 104 and sends instructions and/or data (i.e., work or tasks to complete) to a graphics processing unit 116 to complete. The system memory 104 typically includes dynamic random access memory (DRAM) used to store programming instructions and data for processing by the CPU 102 and the graphics processing subsystem 106. The graphics processing subsystem 106 receives the transmitted work from the CPU 102 and processes the work employing a graphics processing unit (GPU) 116 thereof. In this embodiment, the GPU 116 completes the work in order to render and display graphics images on the display devices 110. In other embodiments, the GPU 116 or the graphics processing subsystem 106 as a whole can be used for non-graphics processing.

As also shown, the system memory 104 includes an application program 112, an application programming interface (API) 114, and a graphics processing unit (GPU) driver 115. The application program 112 generates calls to the API 114 in order to produce a desired set of results, typically in the form of a sequence of graphics images.

The graphics processing subsystem 106 includes the GPU 116, an on-chip GPU memory 122, an on-chip GPU data bus 136, a GPU local memory 120, and a GPU data bus 134. The GPU 116 is configured to communicate with the on-chip GPU memory 122 via the on-chip GPU data bus 136 and with the GPU local memory 120 via the GPU data bus 134. The GPU 116 may receive instructions transmitted by the CPU 102, process the instructions in order to render graphics data and images, and store these images in the GPU local memory 120. Subsequently, the GPU 116 may display certain graphics images stored in the GPU local memory 120 on the display devices 110.

The GPU 116 includes fixed function units 117, programmable processing units 118 and an IO connector 119. The fixed function units 117 include conventional fixed function units having circuitry configured to perform a dedicated function. The fixed function units 117 are implemented in hardware. The programmable processing units 118 include the necessary processors and memory to perform dedicated functions of a pipeline stage. The processors can be specifically configured for processing highly parallel code. The fixed function units 117 and the programmable processing units 118 can be conventional components of a graphics pipeline.

The GPU 116 also includes a single IO connector 119. The IO connector 119 is configured to couple each of the programmable processing units 118 to each of the fixed function units 117 and provide the necessary conversions between software and hardware formats to allow communication of requests and responses between the programmable processing units 118 and the fixed function units 117. More detail of an embodiment of IO connector is discussed below with respect to FIG. 2.

The GPU 116 may be provided with any amount of on-chip GPU memory 122 and GPU local memory 120, including none, and may use on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 115 to the on-chip GPU memory 122 via the system data bus 132.

The GPU local memory 120 typically includes less expensive off-chip dynamic random access memory (DRAM) and is also used to store data and programming used by the GPU 116. As shown, the GPU local memory 120 includes a frame buffer 126. The frame buffer 126 stores data for at least one two-dimensional surface that may be used to drive the display devices 110. Furthermore, the frame buffer 126 may include more than one two-dimensional surface so that the GPU 116 can render to one two-dimensional surface while a second two-dimensional surface is used to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having described a computing system within which the disclosed IO connector and methods may be embodied or carried out, a particular embodiment of an IO connector will be described in the environment of a GPU 200.

Figure 2:
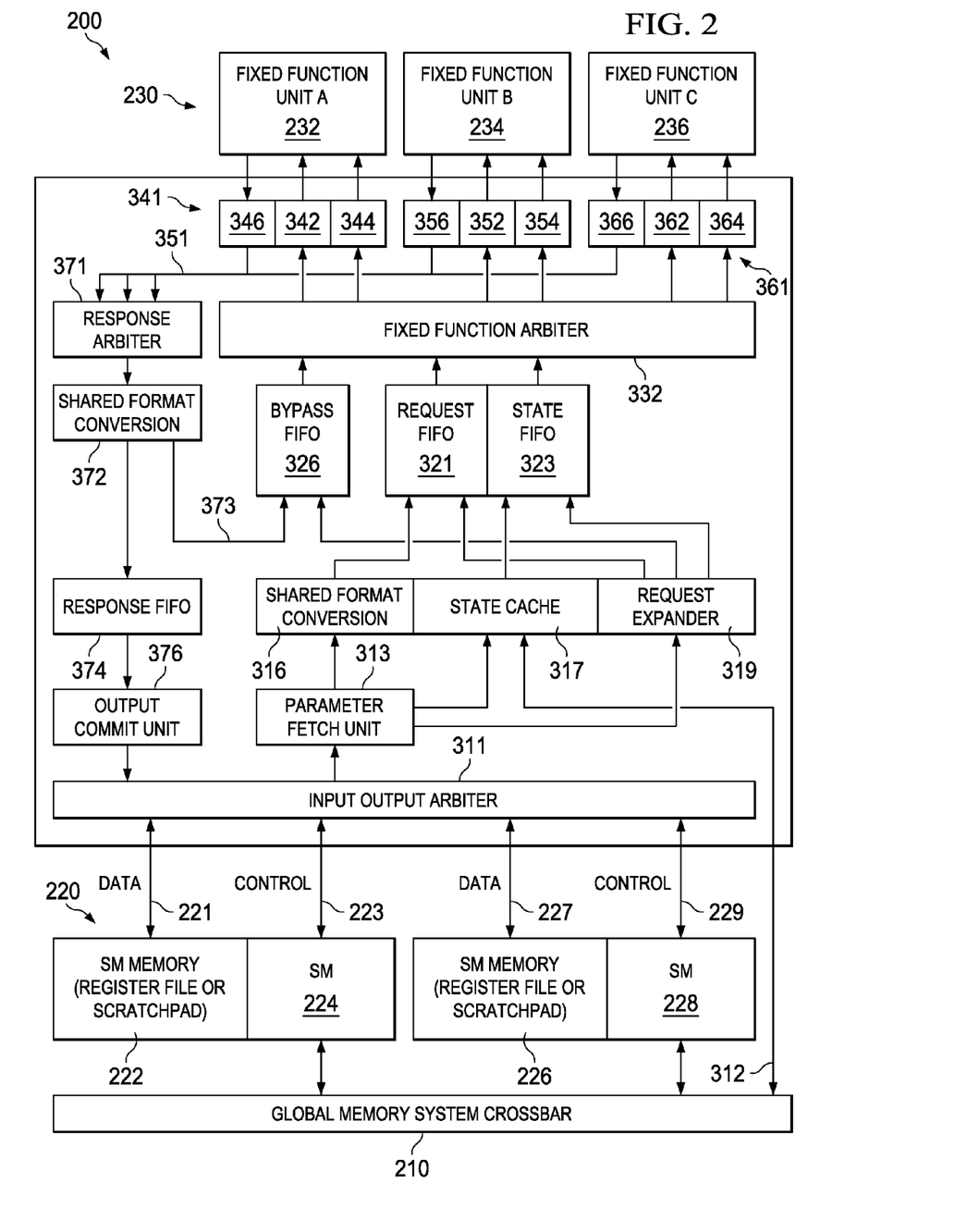
FIG. 2 illustrates a schematic diagram of an embodiment of an input output connector constructed according to the principles of the disclosure.

FIG. 2 illustrates a block diagram of an embodiment of a GPU 200 constructed according to the principles of the disclosure. The GPU 200 includes a global memory system crossbar 210, programmable processing units 220, fixed function units 230 and an IO connector 300. The IO connector 300 is a single interface that connects the programmable processing units 220 to the fixed function units 230 to form a graphics pipeline. Various connections are illustrated in the GPU 200 including internal connections of the IO connector 300. The connectors employed for the various connections can be conventional connectors that are sufficient to communicate the various signals discussed.

The global memory system crossbar 210 provides an interface to a graphics processing system or computing system such as disclosed in FIG. 1. For example, considering FIG. 1 the global memory system crossbar 210 can provide connections to the system memory 104, GPU local memory 120 and on-chip GPU memory 122. The programmable processing units 220 include a SM memory 222, a SM 224, a SM memory 226 and a SM 228. The SM memories 222, 226, are memories that include the data to be processed by the SM 224, SM 228, respectively, or data to be sent to the fixed function units 230 for processing. In different embodiments, the SM memories 222, 226, are a random access memory (RAM), a register file or a scratchpad. The SM 224, SM 228, are streaming multiprocessors that are programmed to operate as a fixed function unit. The SM 224 and the SM 228 are coupled to the global memory system crossbar 210 and the SM memories 222, 226. The global memory system crossbar 210 and the programmable processing units 220 can be conventional devices typically included in a GPU.

The fixed function units 230 can also be fixed function units that are typically found in a GPU. The fixed function units 230 include three different fixed function units, fixed function unit 232, fixed function unit 234 and fixed function unit 236 that are each configured with the necessary circuitry dedicated to perform a particular function of a graphics pipeline. The fixed function units 230 can also be conventional components found in a typical GPU.

The IO connector 300 includes multiple components that are configured to provide non-permanent connections between the programmable processing units 220 and the fixed function units 230 and provide the proper conversions to allow communication and processing of requests and responses therebetween. In one embodiment, the IO connector 300, or components thereof, include the necessary logic or logic circuitry to perform the functions described herein.

In one embodiment, the IO connector 300 provides dynamic connections between the programmable processing units 220 and the fixed function units 230 for each request generated by the programmable processing units 220. A request is an instruction or command to perform an action or work on data. A request is generated by SM 224 and/or SM 226 of the programmable processing units 220 for one of the fixed function units 230 to perform. A response is generated by one of the particular fixed function units 230 as a result of the request. Associated with each request are parameters and state information that the fixed function units 230 use to process the requests.

The IO connector 300 includes an input output (IO) arbiter 311, a parameter fetch unit 313, a shared format converter 315, a state cache 317 and a request expander 319.

The IO arbiter 311 provides a single interface for each of the programmable processing units 220 of the GPU 200 to form a graphics pipeline with the fixed function units 230. The IO arbiter 311 is connected to the SM memory 222 and the SM memory 226 via bi-directional data connections 221 and 227. The IO arbiter 311 is also connected to the SM 224 and the SM 228 via bi-directional control connections 224, 228, respectively. In addition to providing a single connection interface with the programmable processing units 220, the IO arbiter 311 is also configured to arbitrate between various requests generated from different SMs such as the SMs 224, 228.

The fetch unit 313 is configured to fetch or obtain parameters of the requests from the SM memories 222, 226. The fetch unit 313 obtains the request parameters from the SM memories 222, 226, via the bi-directional data connections 221, 226, and the IO arbiter 311. The primary flow of requests is uni-directional from the IO arbiter 311 to the fetch unit 313. However, control information also flows from the fetch unit 313 to the IO arbiter 311. As such, the connecting path therebetween is shown as bidirectional. The fetch unit 313 is also configured to extract state pointers from the requests and forward the state pointers to the state cache 317.

The shared format converter 316 is logic configured to perform common transformations to the request parameters. The shared format converter 316 performs common transformations for requests from all of the SMs coupled thereto, i.e., SM 224 and SM 228. A common transformation is a transformation from one common format to a second common format. The second common format is not specific to a particular input format of one of the fixed function units 230. Examples of common transformations include translations from floating point to fix point formats (e.g., IEEE FP32 to 24.8 fixed point) or from high to low-precision floating point (32-bit floating point to 16-bit floating point). These common transformations are performed since software typically operates on higher precision floating point data (fp32), but hardware more commonly uses fixed point or low-precision floating point. Since complex circuitry is typically needed for these common transformations, require complex circuitry, the shared format converter 316 is beneficially shared circuitry for all of the units.

The state cache 317 receives the state pointers from the fetch unit 313 and retrieves state information based thereon. In one embodiment, the state cache 317 is configured to obtain the state information via the global memory system crossbar 210 across a bi-directional memory connection 312. In some embodiments, the state information is stored in a GPU local memory such as GPU local memory 120 of FIG. 1. In other embodiments, the state information is stored in a system memory, such as system memory 104 of FIG. 1.

The request expander 319 is configured to expand a single request from a SM into multiple fixed functional unit requests. In one embodiment, the request expander 319 is a finite state machine (FSM) that is programmed to expand the request. In some embodiments, the request expander 319 is a macro FSM and the expansion is defined via micro-code macros.

The IO connector 300 also has buffers including a request first-in first-out (FIFO) 321, a state FIFO 323 and a bypass FIFO buffer 326. The request FIFO buffer 321 receives and stores the requests from the shared format converter 316 and, if applicable, the request expander 319. The state FIFO 323 receives and stores the state information from the state cache 317 and the request expander 319 if applicable. The bypass FIFO 326 receives and stores expanded requests from the request expander 319 and converted responses from the fixed function units 230 (i.e., outputs from the fixed function units 230). The bypass FIFO 326 is connected to a shared format converter 372 via a bypass connection 373. The bypass connection 373 provides a bypass path that sends responses from one of the fixed function units 230 to the input of a second one of the fixed function units 230 and combines them with SM inputs or requests from a SM 224, 228.

The bypass path and the request expander 319 provide additional features for the IO connector 300 that improve efficiency of the graphics pipeline above just the connections and conversions. For example, these features can be used to implement different embodiments for a blitter, HW-accelerated clears, fast solid color triangles and fast Z-only rendering. In each of the below embodiments, the noted shader stages can be performed by a particular one of the fixed function units 230. For example, for blits, the fixed function unit 232 can be the texture unit.

Considering blits for example, the request expander 319 is configured to expand a single SM request into a 4×4 quads that are sent to a texture unit. The texture results are combined with the coordinates of the SM request and sent to a surface processor to be rendered to a display screen.

For clear, for example, the request expander 319 can expand a single SM request into a number of 8×8 tiles that are sent to a raster unit to be tested against clipping rectangle. The results are sent to a depth processor to clear the tile.

For solid color triangles, for example, a SM sends in a triangle to tile. The request expander 319 sends the triangle information to a raster unit to generate a coverage mask. This is combined with a Z-plane equation. In one embodiment, the bypass FIFO 326 combines the coverage mask with the Z-plane equation, wherein the Z-Plane is placed there by the request expander 319 and the coverage mask is placed there by the shared format conversion block 372. The combination can then be sent to ZROP. The result coverage mask is expanded by the request expander 319 into 4×4 quads and sent to a surface processor to be rendered to a display screen.

Each of the above noted FIFO buffers 321, 323, 326, are coupled to a fixed function arbiter 332 that is coupled to interface logic for the fixed function units 230. The interface logic is coupled to and configured for a specific one of the fixed function units 230. In one embodiment, each interface logic is configured or built for a specific fixed function unit. Thus, the interface logic includes specific logic that is dedicated for connecting to a particular fixed function unit. The interface logic includes interface logic 341, interface logic 351 and interface logic 361. The interface logic 341 includes a request converter 342, shadow state logic 344 and a response converter 346. Similarly, the interface logic 351 includes a request converter 352, shadow state logic 354 and a response converter 356 and the interface logic 361 includes a request converter 362, shadow state logic 364 and a response converter 366.

Each of the request converters 342, 352, 362, are configured to convert the requests to a unit specific input format for the corresponding fixed function units 232, 234 and 236. As such, the fixed function units 232, 234 and 236 can execute the requests as in a fixed function pipeline. In one embodiment, the request converters 342, 352, 362, map the pre-converted requests to the unit specific input format.

The shadow state logic 344, 354, 364, are configured to provide the proper state for the respective fixed function units 232, 234, 236. In one embodiment, the shadow state logic 344, 354, 364, are configured to compare the retrieved state information to the shadow state of the particular fixed function units 232, 234, 236, and generate necessary state updates based on the comparison.

At least some of the above noted components of the IO connector 300 are employed when sending requests from the programmable processing units 220 to the fixed function units 230. The IO connector 300 also includes additional components that are employed when sending outputs (i.e., responses to the requests) from the fixed function units 230 to the programmable processing units 220. These components include the response converters 342, 352, 362, that are configured to convert responses or outputs from the output format of the specific fixed function units 232, 234, 236, to an intermediate format. The intermediate format is identical to or at least comparable to a final format for the programmable processing units 220 except that conversions performed by a shared format converter 372 have not been applied yet. Specifically, unit outputs are still in low-precision floating point or fixed-point format depending on the unit specific output. The shared format converter 372 converts these to software friendly values, such as fp32 values.

In addition to the shared format converter 372, the additional components of the IO connector 300 include the response arbiter 371, a response FIFO 374 and an output commit unit 376. The response arbiter 371 is configured to arbitrate between the fixed function units 230 that have outputs ready and have been converted to the intermediate format by the applicable response converters 342, 352, 362. The response arbiter 371 directs the responses in the intermediate format to the shared format converter 372. The shared format converter 372 is configured to convert from the unit-specific intermediate format to a final software-friendly format for the programmable processing units 220. Thus, the shared format converter 372, similar to the shared format converter 316, is employed to convert the responses from all of the fixed function units 230 to a software-friendly format. This is in contrast to the individual response converters 342, 352, 362, that are specifically designed to perform format conversion for a single one of the fixed function units 230.

The response FIFO 374 receives and stores the software-friendly format responses to deliver to the appropriate programmable processing units 220.

The output commit unit 376 is configured to deliver the software-friendly format responses stored in the response FIFO 374 to the appropriate programmable processing units 220. The output commit unit 376 is also configured to send an acknowledgement signal to the appropriate programmable processing units 220 after all response data has been written.

Figure 3:
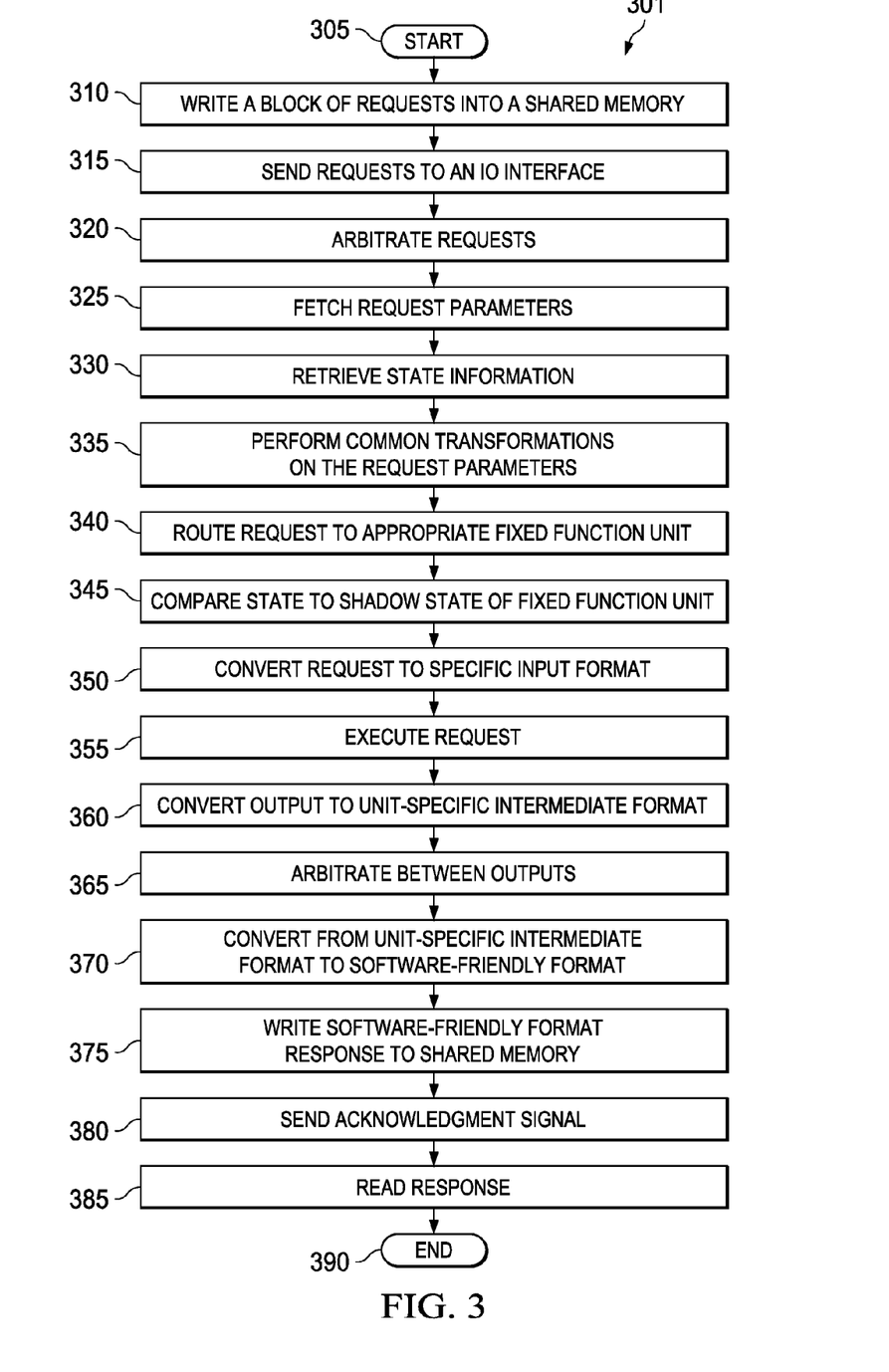
FIG. 3 illustrates a flow diagram of a method of operating a graphics pipeline carried out according to the principles of the disclosure.

The following figure, FIG. 3, provides embodiments of methods of communicating between programmable processing units and fixed functions unit. The IO connector 300 of FIG. 2 can be employed for these methods.

FIG. 3 illustrates a flow diagram of a method 301 of issuing a fixed function request in a graphics pipeline carried out according to the principles of the disclosure. The graphics pipeline includes programmable functional units and fixed functional units that can be dynamically coupled together via an IO interface, such as the IO connector 300 of FIG. 2. As such, in this illustrated embodiment the IO connector 300 is referred to for explanation. In the method 301, the programmable functional units can be SMs that are coupled to a shared memory as illustrated in FIG. 2. As such, in some embodiments the various data and control connections illustrated in the GPU 200 of FIG. 2 can be employed for the method 301.

The method 301 begins in a step 305.

In a step 310, a block of requests are written into a shared memory. The requests are work requests to be performed by one of the fixed functional units. A SM or multiple SMs write the block of requests. The shared memory can be a RAM such as a register file, a L1 or a scratchpad. The requests contain request parameters, in a format defined as part of the SM's ABI, and a global memory pointer to the request state, which is stored in a memory associated with the graphics pipeline.

At least one request is sent to an IO interface in a step 315. The request defines the target unit (i.e., the target fixed function unit), the location or address of the request stored in a SM memory, such as the SM memory 222 and the length of the request. In one embodiment, a SM sends the request via a control connection, such as one of the control connections 203, 207.

In a step 320, the received requests are arbitrated. The requests can be received from different SMs coupled thereto, such as the SM 204 and the SM 208. An IO arbiter such as the IO arbiter 311 can receive the requests and arbitrate between the requests.

Once a request has been accepted, request parameters are fetched in a step 325. The request parameters can be fetched from a shared memory via a data connection by the IO interface. In one embodiment, the parameter fetch unit 313 fetches or obtains the request parameters from one of the shared memories 202, 206, via the corresponding data connection 201 or 205 and the IO arbiter 311.

State information is retrieved in a step 330. In one embodiment, the state pointer is extracted from the request and sent to a state cache. The state cache retrieves the state information stored thereon or fetches the state information from another cache or memory via a global memory system connection. In one embodiment, the state cache 317 or the global memory system crossbar are employed by the IO connector 300 to retrieve the state information.

In a step 335, common transformations of the request parameters are performed. Dedicated logic, such as shared conversion logic of the IO interface can perform the common transformations, such as floating to fixed point conversion of the request parameters. In one embodiment, the IO connector 300 employs the shared format conversion logic 316 to perform the format conversion. In some embodiments, there are graphics specific conversions, such as color space conversions (RGB→YUV) that are performed. Other common transformations include changes in numeric precision or simple reordering of values, e.g., from struct of arrays to arrays of structs within the request.

The request is routed to the appropriate fixed function unit in a step 340. After conversion of the request parameters, the transformed parameters can be stored in a request buffer. Additionally, the obtained state information can be stored in a state buffer. An arbiter for the fixed function units can receive the request in its transformed state and direct the request to the interface logic for the appropriate fixed function unit. The target fixed function unit is part of the request since the request defines the target unit. In one embodiment, the request includes a fixed function ID field to identify the target fixed function unit. In one embodiment, the IO connector 300 employs the request FIFO 321, the state FIFO 323 and the fixed function arbiter 332 to direct the request to either the interface logic 341, the interface logic 351 or the interface logic 361.

In a step 345, the state object associated with the request is compared to the shadow state of the appropriate fixed function unit and necessary state updates are generated. A shadow state is an accessible copy, which is typically an easily accessible copy, of the state that the unit is currently configured in. Interface logic for the particular fixed function unit can compare the states and generate the necessary updates. In one embodiment, shadow state logic 344, 354 or 364, generates the necessary updates after comparing the state information to shadow states.

Conversion of the requests to the specific input format of the appropriate fixed function unit is performed in a step 350. In one embodiment, per-unit conversion logic can map the pre-converted request for conversion to the unit specific input format. In some embodiments, the per-unit conversion logic includes or is associated with a look-table that is used for the mapping and the conversion. In one embodiment, the request converter logic 342, 352 or 362 is employed for the mapping conversion.

The particular or target fixed function unit executes the request in a step 355. Accordingly, the fixed function unit generates an output or response to the request. In one embodiment, the IO interface successfully converts the software based request into the proper format for the fixed function unit to execute the request in the exact same way as in a fixed function pipeline. The IO connector 300, for example, can provide the proper conversion at an instruction by instruction level.

In a step 360, the output is converted from a fixed function unit output format to a unit-specific intermediate format. In one embodiment, unit specific conversion logic converts the output to the unit-specific intermediate format. For example, the response converter 346, 356 or 366 of FIG. 2 can perform the conversion.

Arbitration between outputs from the fixed function units is performed in a step 365. In one embodiment, the response arbiter 371 arbitrates between the fixed function units that have generated outputs. At this point the outputs have already been converted into the unit-specific intermediate format via unit specific conversion logic.

In a step 370, conversion between the unit-specific intermediate format to a final software-friendly format of the response is performed. In one embodiment, shared format conversion logic is used for this conversion, such as the shared format conversion logic 372 of FIG. 2. The response in the software-friendly format can be stored in a buffer, such as the response FIFO 374.

The converted response data is written back into the shared memory in a step 375. The converted response data can be written from a buffer, such as the response FIFO 372. In one embodiment, the output commit unit 376 is employed to write the converted response data to a shared memory 222 or 226 via the input output arbiter 311 and the bi-directional data connections 221, 227, respectively.

An acknowledgment signal is sent to the SM in a step 380. The acknowledgment signal is sent after all response data has been written to the shared memory. In one embodiment, the IO connector 300 can send the acknowledgement signal to a SM via the control bus 203 or 207. In a step 385, the SM reads the response from the shared memory. The method 301 then ends in a step 390.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

A portion of the above-described apparatuses, systems or methods may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions of the apparatuses described herein. As noted above, a SM can be implemented on a special purpose processor that is well suited for highly parallel code.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. An input output connector for a graphics processing unit having a graphics pipeline including fixed function units and programmable function units, comprising:
 a request arbiter configured to connect to each of said programmable function units, receive fixed function requests therefrom and arbitrate said requests; and
 fixed unit converters, wherein each of said fixed unit converters is dedicated to a different, single one of said fixed function units and is configured to convert said requests directed to said single one to an input format for said single one.

2. The input output connector as recited in claim 1 further comprising shadow state logic, wherein each of said shadow state logic is dedicated to said single one of said fixed function units.

3. The input output connector as recited in claim 1 further comprising shared request converters configured to transform parameters of said requests from one common format to another common format.

4. The input output connector as recited in claim 1 further comprising response converters wherein each of said response converters are dedicated to said single one of said fixed function units and is configured to convert a response from said single one from an output format thereof to an intermediate format.

5. The input output connector as recited in claim 1 further comprising a response arbiter that receives responses from each of the fixed function units.

6. The input output connector as recited in claim 1 further comprising shared format response conversion logic configured to convert responses from said fixed function units from an intermediate format to a software format for said programmable function units.

7. The input output connector as recited in claim 1 further comprising a request data fetch unit configured to obtain parameters of said requests from shared memories associated with said programmable functional unit.

8. The input output connector as recited in claim 1 further comprising a state cache configured to obtain state information for said requests.

9. The input output connector as recited in claim 1 further comprising a bypass path positioned to connect an output from a first fixed function unit to an input of a second fixed function unit and combine with data from said programmable function units.

10. The input output connector as recited in claim 1 further comprising a request expander configured to expand a single request from one of said programmable function units into multiple requests for fixed function units.

11. A method of operating a graphics pipeline having fixed function units and programmable function units, comprising:
 receiving a request from one of said programmable function units for one of said fixed function units to generate a response;
 obtaining parameters and state information for said request;
 routing said request including said parameters and said state information to one of fixed unit converters, wherein each of said fixed unit converters is dedicated for a different, single one of said fixed function units; and
 converting said request, employing said one of said fixed unit converters, to a unit specific input format for said one of said fixed function units.

12. The method as recited in claim 11 wherein each step of said method is performed by a single input output connector coupled to each of said programmable function units and each of said fixed function units.

13. The method as recited in claim 11 further comprising arbitrating said request with additional requests from said programmable function units.

14. The method as recited in claim 11 further comprising transforming said parameters from a first common format to a second common format.

15. The method as recited in claim 11 further comprising comparing said state information to a shadow state of said one of said multiple fixed function units.

16. The method as recited in claim 11 further comprising converting a response from said one of said multiple fixed function units from an output format thereof to an intermediate format and converting the response from said intermediate format to a software friendly format for said programmable function unit.

17. A graphics processing unit, comprising:
 fixed function units;
 programmable function units; and
 a single input output connector configured to connect each of said programmable function units to each of said fixed function units and including fixed unit converters, wherein each of said fixed unit converters is dedicated to a different, single one of said fixed function units and is configured to convert fixed function requests directed to said different, single one of said fixed function units to a respective input format for said different, single one of said fixed function units.

18. The graphics processing unit as recited in claim 17 wherein at least a portion of said single input output connector is programmable to provide non-static connections between said fixed function units and said programmable function units.

19. The graphics processing unit as recited in claim 17 wherein said single input output connector includes a bypass path positioned to connect an output from a first one of said fixed function units to an input of a second one of said fixed function units.

20. The graphics processing unit as recited in claim 17 wherein said single input output connector includes a request expander configured to expand a single request from one of said programmable function units into multiple requests for multiple ones of said fixed function units.

\* \* \* \* \*